May 12, 1953 J. F. JOY 2,638,325
DRILLING APPARATUS
Filed Dec. 29, 1947 5 Sheets-Sheet 1
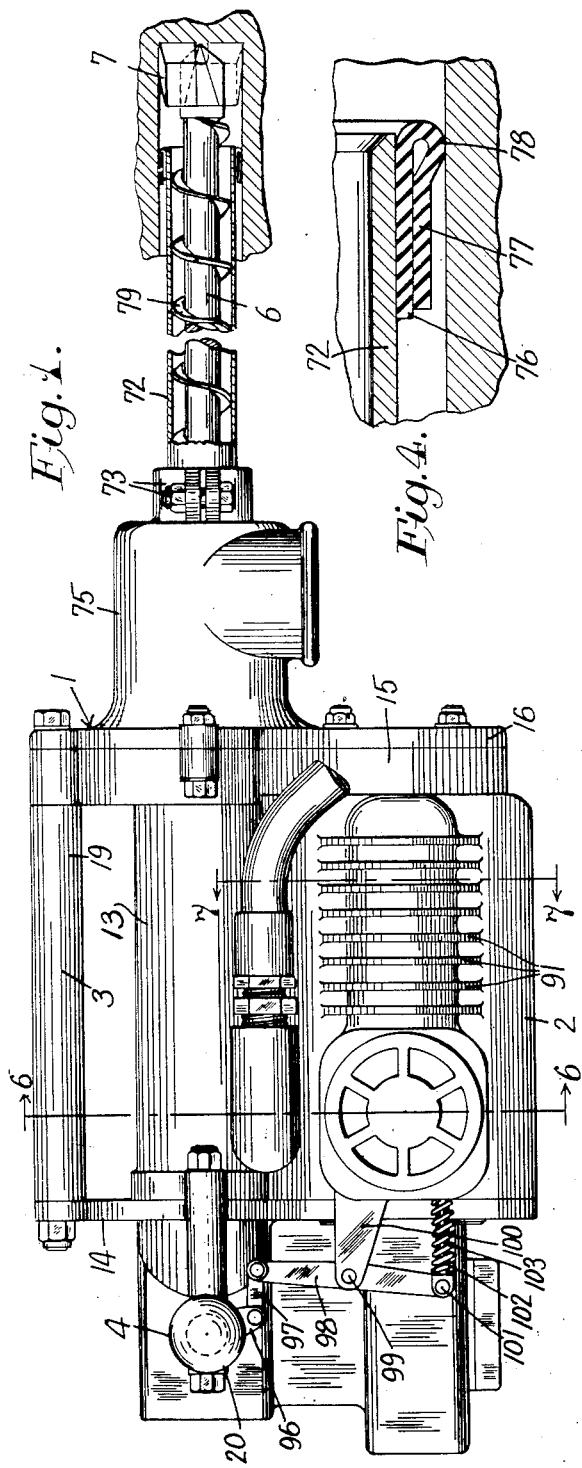
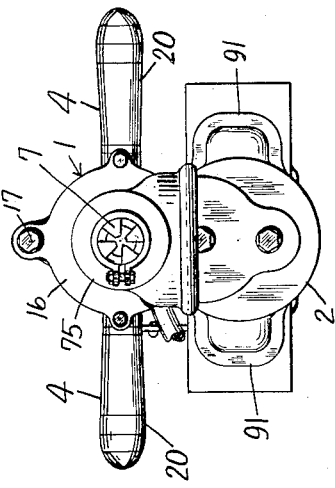
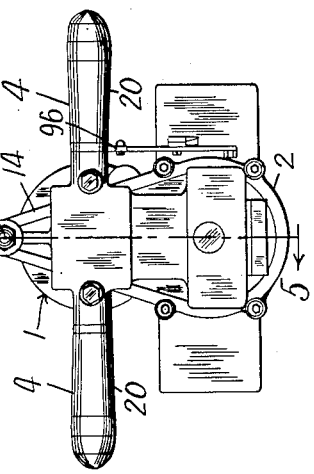
Inventor:
Joseph F. Joy.
by Charles F. Osgood,
Attorney

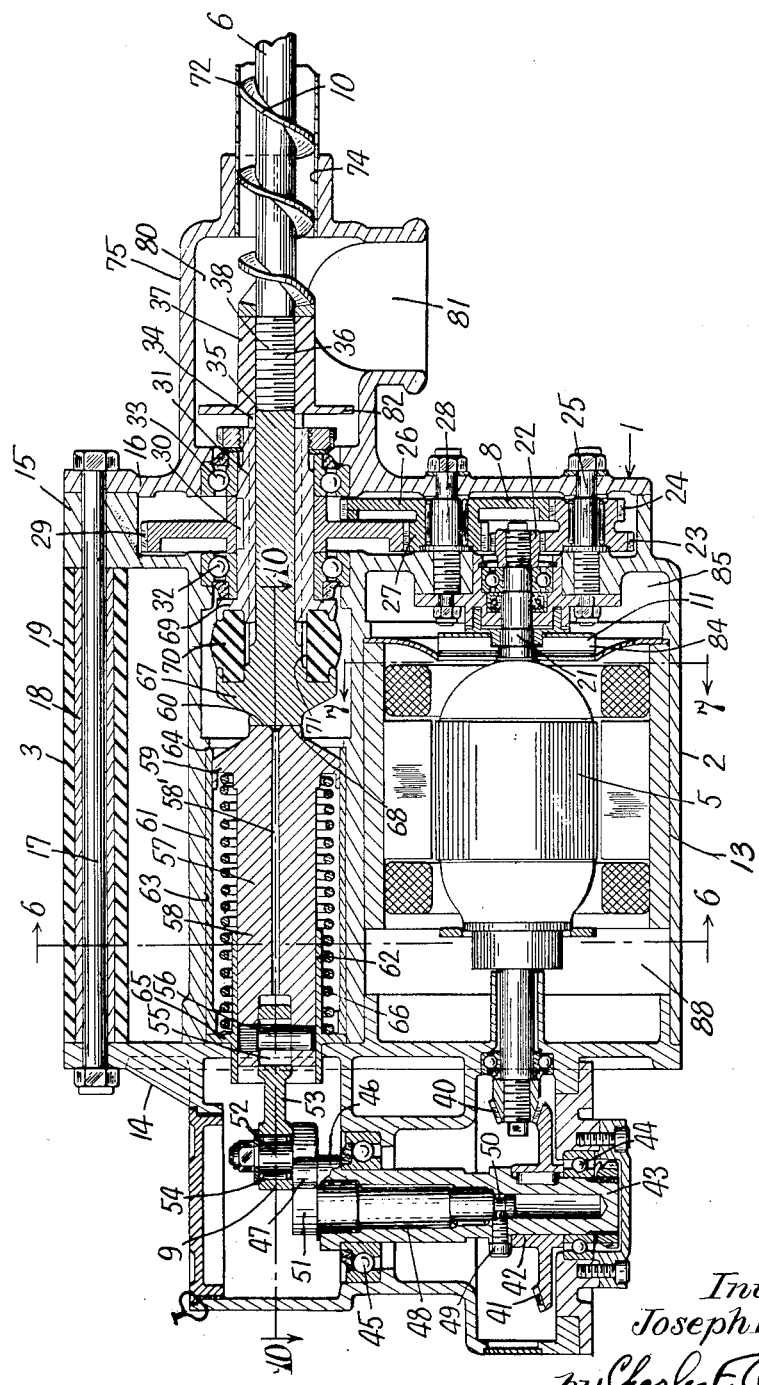

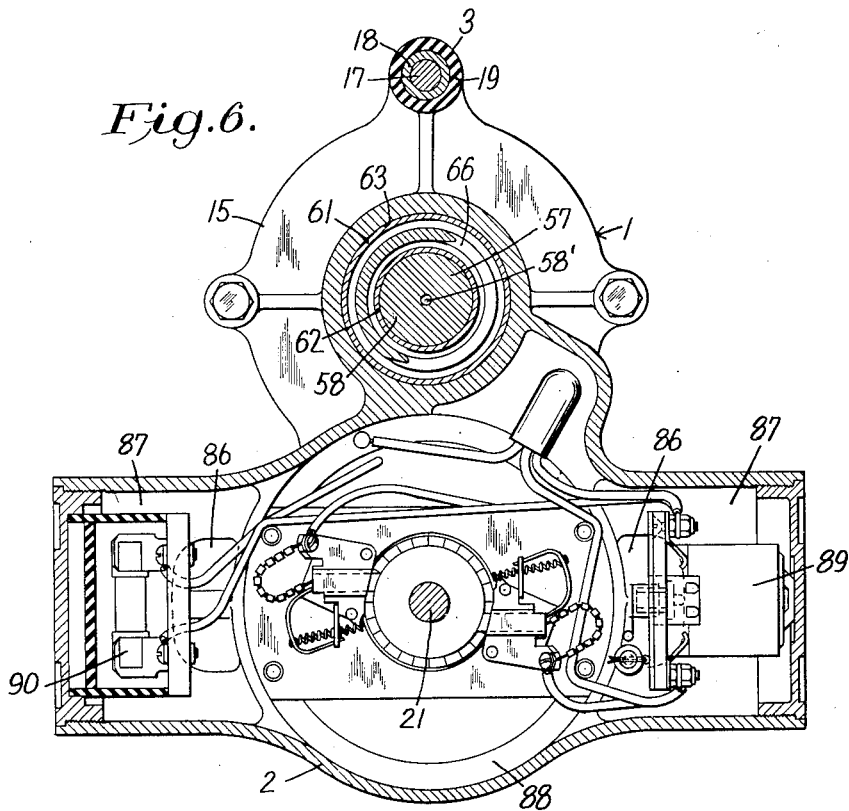
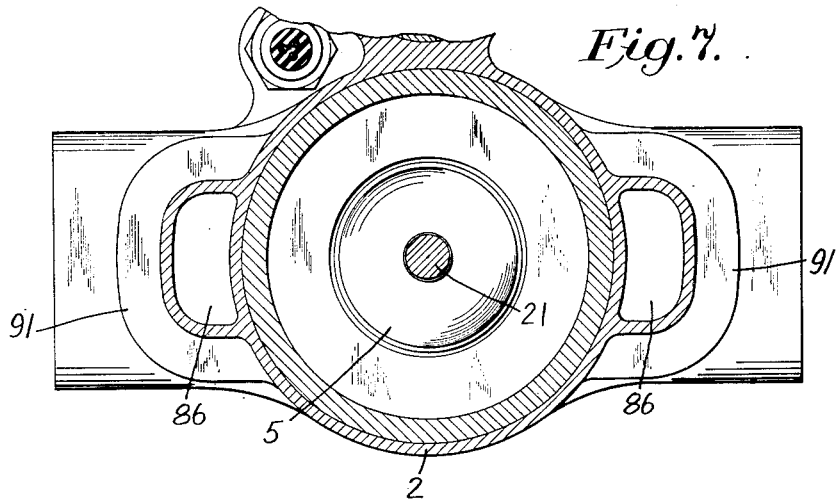

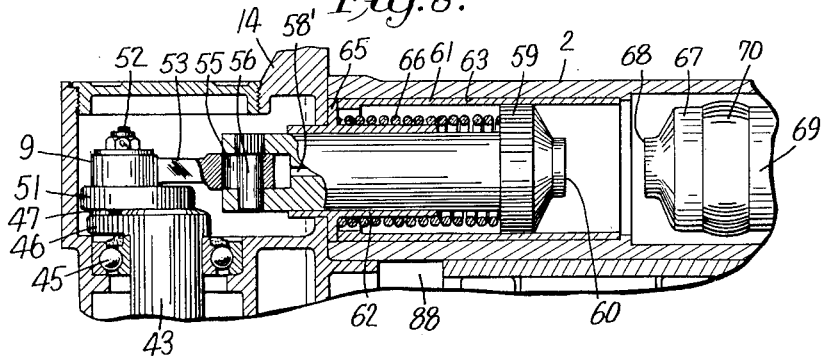
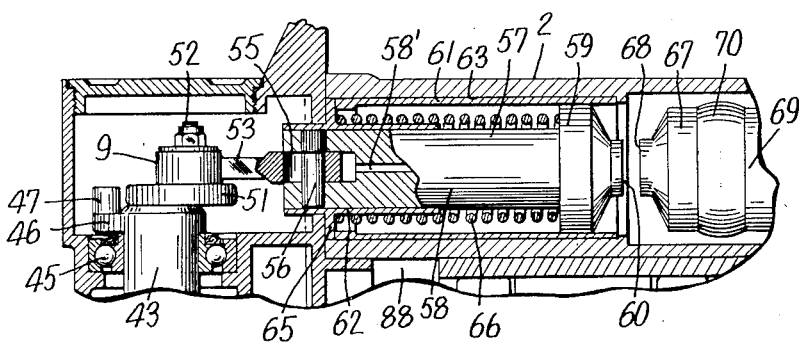
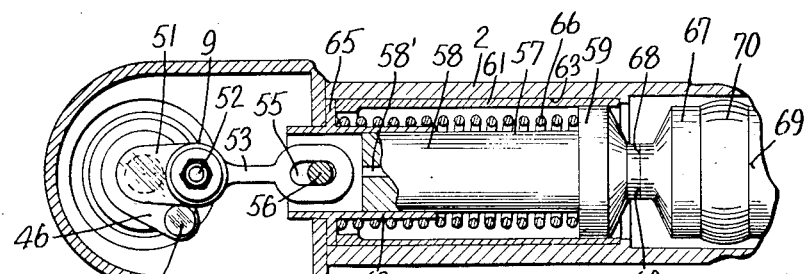
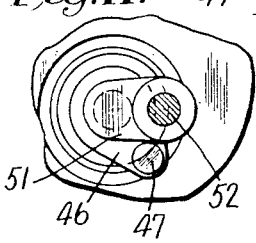
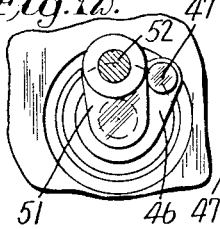

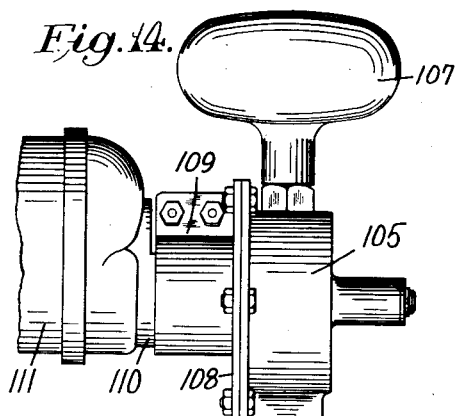
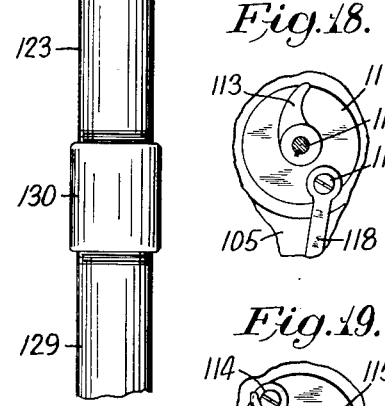
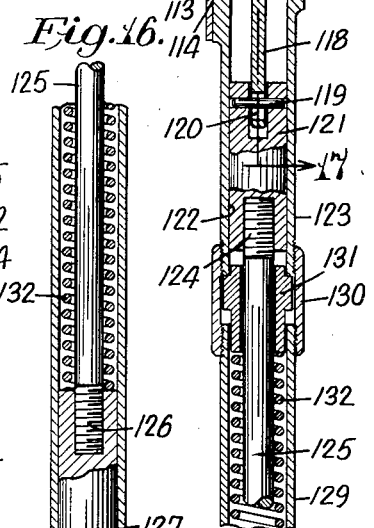
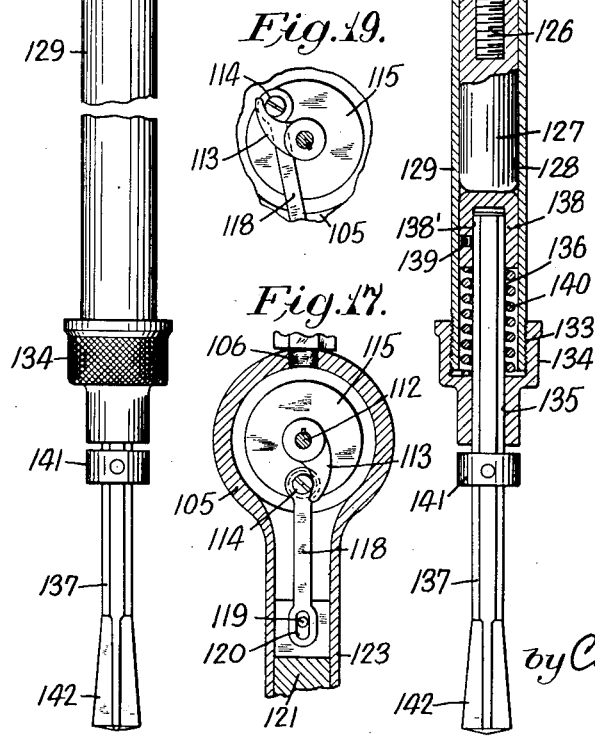
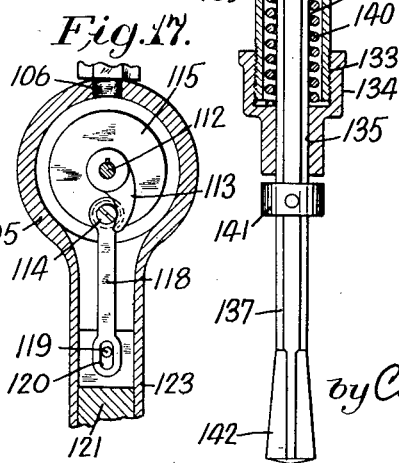

Patented May 12, 1953

2,638,325

UNITED STATES PATENT OFFICE 2,638,325

DRILLING APPARATUS

Joseph F. Joy, Pittsburgh, Pa., assignor to Joy Manufacturing Company, Pittsburgh, Pa., a corporation of Pennsylvania Application December 29, 1947, Serial No. 794,281

10 Claims. (Cl. 255—39)

This invention relates to drilling apparatus, and from one aspect thereof, to drilling apparatus by which a drilling implement may be rotated and caused to perform a boring operation and which also incorporates means for imparting to the rotating implement a rapid series of impacts and thereby greatly increasing the drilling speed. From another aspect, it relates to devices for imparting a rapid series of blows to a drilling implement, regardless of whether, as is very desirable in some forms of construction such as are hereinafter described, there be rotation of the implement to cause it to operate with a boring action, or whether the implement accomplish its drilling substantially wholly percussively, with rotation only to effect presentation of the cutting edge or edges of the implement in various positions to the material being drilled, thereby to effect more efficient operation.

Drilling devices for effecting the formation of holes by a boring action are well known. Those of a type for forming holes by percussion are well known. So also are devices in which the material penetration is effected by percussive actuation of a drill bit, with rotation of the bit between blows to effect change of its position relative to the material to be drilled, in order that such material may be more effectively cut away. The present invention, from its aspect first above mentioned, comprises means—improved in itself —for superimposing upon a boring action, for the effecting of which improved means is provided, a rapid impact action, which is transmitted through the implement to the material being detached and, by the cutting action, the deepened boring cut, and the vibration provides a very fast and effective formation and deepening of the hole. The invention also includes, from its other aspect, and as a part of its first aspect also, improved means for effecting the percussive actuation of a drilling implement. In accordance with this invention, from one aspect, a motor, preferably an electric motor, may drive the drilling implement for rapidly rotating the implement to effect boring, and this same motor may drive a mechanical impact mechanism which delivers a rapid series of impact blows to the drilling implement as the latter is rapidly rotated, to supplement the boring action with an impact action to increase the drilling speed. There may be associated with the impact and rotating mechanism, and likewise driven by the motor, means for mechanically conveying the cuttings from the drill hole as drilling progresses. Also, the motor has a novel cooling arrangement.

It is an object of the present invention to provide an improved drilling apparatus. Another object is to provide an improved drilling apparatus for drilling blast holes in coal or similar material whereby high speed penetration of the material is possible. A further object is to provide an improved rotary drilling apparatus having embodied therein improved means for imparting a vibratory or percussive action to the drilling implement to increase the drilling speed. Yet another object is to provide an improved impact mechanism for percussively actuating a drilling implement. Still another object is to provide an improved rotating and impact mechanism for actuating a drilling implement and driven by a rotary motor such as an electric motor. Another object is to provide improved drilling apparatus having novel arrangements and combinations of parts. These and other objects and advantages of the invention will, however, hereinafter more fully appear.

In the accompanying drawings there are shown for purposes of illustration two forms which the invention, in at least one of its aspects, may assume in practice.

In these drawings:

Fig. 1 is a side elevational view, with parts shown in longitudinal vertical section, illustrating a drilling apparatus constructed in accordance with a preferred illustrative embodiment of the invention.

Fig. 2 is a rear end view, and Fig. 3 a front end view, both on a reduced scale, of the drilling apparatus shown in Fig. 1.

Fig. 4 is an enlarged fragmentary sectional view illustrating the sealing means between the conveyor tube and the walls of the drill hole.

Fig. 5 is an enlarged view in longitudinal vertical section taken substantially on line 5—5 of Fig. 2, and with the forward portion thereof broken away.

Fig. 6 is an enlarged cross-sectional view taken substantially on line 6—6 of Figs. 1 and 5.

Fig. 7 is a fragmentary sectional view taken substantially on line 7—7 of Figs. 1 and 5.

Figs. 8 and 9 are fragmentary sectional views, with parts shown in full, showing parts of the impact mechanism in different operating positions.

Fig. 10 is a longitudinal vertical sectional view taken substantially on line 10—10 of Fig. 5, and with parts shown in full.

Figs. 11, 12 and 13 are detail views of the crank and arm mechanism for actuating the impact element, and with the parts shown in different operating positions.

Fig. 14 is a side elevational view of a drilling apparatus constructed in accordance with a modified embodiment of the invention from one of its aspects.

Figs. 15 and 16, when taken together, constitute a vertical sectional view through the drilling apparatus shown in Fig. 14.

Fig. 17 is a vertical sectional view taken substantially on line 17—17 of Fig. 15.

Figs. 18 and 19 are detail views showing the crank mechanism of Fig. 17 in different operating positions.

In both embodiments of the invention, the improved drilling apparatus is shown of the portable hand-held type, although, evidently, features of the invention may be embodied in drills of other types.

The drilling apparatus shown in Figs. 1 to 13 inclusive is especially adapted for use in drilling coal or similar materials and is generally designated 1, and generally comprises a casing or housing 2 provided with a longitudinal supporting handle 3 and lateral supporting handles 4, 4 and carrying a motor 5, preferably an electric motor, which actuates a drilling implement 6 having a detachable drill bit 7 of a conventional design. The drilling implement is rotated through rotating mechanism 8 and percussively actuated by impact or vibratory mechanism 9, both driven by the motor. Conveying means 10 is associated with the drilling implement for conveying the cuttings from the drill hole, and cooling means 11 is associated with the motor 5 for cooling the latter.

The casing or housing 2 includes a central body portion 13 provided with a detachable rear end head 14 secured to the casing body as by screws and an integral front head 15 provided with a detachable front plate 16 secured to the front head likewise as by screws. The supporting handle 3 is arranged along the upper side of the casing body between the end heads 14 and 15, and includes a longitudinal bolt 17 (Fig. 5) secured to the heads and surrounded by a sleeve 18, about the outer surface of which a rubberlike grip 19 is attached. The handles 4, 4 project laterally in alignment from the opposite sides of the rear head 14 and are similarly provided with rubberlike grips 20. Thus the drill may be readily transported, and supported with respect to the work during drilling, with comparative ease. The casing contains the motor 5.

Now referring to the rotating mechanism 8 for the drilling implement, it will be noted that fixed to the front end of the motor shaft 21 is a spur pinion 22 meshing with a spur gear 23 which has formed integral therewith a coaxial spur gear 24. The gears 23 and 24 are journaled on a shaft 25 supported within the casing head 15 and suitably fixed to the front plate 16. The gear 24 meshes with and drives a large spur gear 26 which has formed integral therewith a coaxial spur gear 27. The gears 26 and 27 are journaled on a shaft 28, likewise supported within the front casing head and fixed to the front plate. The gear 27 meshes with and drives a large spur gear 29 keyed at 30 to a hollow shaft or sleeve 31 journaled in bearings 32 and 33 respectively supported by the casing-body and the front head. Arranged within the shaft 31 and splined thereto at 34 is a reciprocable shaft member 35. Threadedly secured at 36 to the front end of the splined shaft 35 is a coupling member 37 providing a threaded socket for receiving the threaded shank 38 of the drilling implement. Thus, when the motor 5 is running, the drilling implement is rapidly rotated to effect its rotary boring function through the gearing above described.

The impact mechanism 9 comprises a bevel pinion 40 fixed to the rear end of the motor shaft 21 and meshing with and driving a bevel gear 41 having its hub 42 keyed to a transverse shaft 43 journaled within bearings 44 and 45 suitably supported within the rear head 14. The inner end of the shaft 43 is formed with a crank arm 46 carrying a crank pin 47. Arranged in the bore of the shaft 43 in coaxial relation with the shaft is a relatively rotatable shaft 48 held against axial displacement from the shaft bore by a screw 49 projecting into an annular groove 50 on the reduced inner end of the shaft 48 as shown in Fig. 5. The outer end of the shaft 48 is formed with a crank arm 51 carrying a crank pin 52 to which the rear end of a connecting rod or link 53 is pivotally attached at 54. The front end of the link 53 is longitudinally slotted at 55, and passing through this slot is a transverse pin 56 secured at its ends within the rearward portion of a reciprocable impact element 57. This impact element has a cylindrical body 58 formed with a small axial passage 58' and provided with an enlarged circular forward portion or flange 59 tapering to a forward impact surface 60. The passage 58' acts as a pressure relief to prevent excessive air pressures from building up in advance of the piston. The front circular portion or flange 59 is reciprocably guided in a sleeve 61, and the body 58 is reciprocably guided in a sleeve 62. The sleeve 61 is arranged in a longitudinal bore 63 in the casing body and is seated at its forward end against a shoulder 64, and the sleeve 62 is formed with a flange 65 clamped between the rear end of the sleeve 61 and the rear head 14, as illustrated. Encircling the sleeve 62 and the body of the impact element is a powerful coil spring 66 which acts between the flange 59 and the flange 65 to urge the impact element in a forward direction. The splined shaft member 35 has a rearward enlargement 67 formed with a rear surface 68 which receives the impact blows of the impact element 57. The hollow shaft or sleeve 31 is formed with a rearward enlargement 69, and secured between the enlargement 67 and 69 and surrounding the rearward portion of the shaft 35 is suitable resilient means, herein a mass 70 of resilient material desirably composed of a rubberlike substance such as "neoprene," which, due to its inherent resiliency, urges the splined shaft 35 toward its rearmost position with the coupling member 37 against the front end of the splined shaft 35, as shown in Fig. 5. There is clearance at 71 between the inner surface of the resilient mass 70 and the shaft member 35, which permits the mass to expand inwardly, as well as outwardly, when under substantial compression, to obtain the desired resilience. As the shaft 43 is rotated by the motor 5 through the bevel gearing, the crank arm 46 is turned about the axis of the shaft 43 to bring the crank pin 47 against one side of the crank arm 51 (see Fig. 11), to cause the crank arm 51 to turn with the shaft 43 about the axis of the shaft 48 (see also Fig. 12) thereby to draw the impact element 57 rearwardly against the action of the spring 66, compressing the latter to a predetermined high degree. Before the crank pin 47 assumes its rearmost position, as shown in Fig. 13, the crank arm 51 passes dead center and then leaves the crank pin 47, permitting the highly compressed spring 66 to drive the impact element 57 forwardly with great speed to deliver a powerful blow to the impact surface 68 of the splined shaft 35. Since the drilling implement is fixed to the shaft 35, the blow of the impact element is transmitted therethrough to the drill bit 7. A rapid series of blows are delivered to the impact surface of the shaft 35 during the drilling operation to actuate the drill bit to perform a percussive cutting action, and this percussive action supplements the rotary boring action, thereby resulting in increased drilling speed.

The conveying means 10, associated with the drilling implement, comprises an elongated cylindrical tube 72 secured at its rear end as by a split clamp and bolt 73 in a bore 74 in a forward extension 75 of the front head plate 16. This tube is adapted to extend into the drill hole in the manner shown in Fig. 1, and its outer end has fixed, as by bonding to its exterior, a resilient sleeve 76 preferably composed of a rubberlike material. This sleeve is folded back on itself at 77 to provide a circular yieldable wall 78 sealingly engaging the walls of the drill hole. Formed on the exterior of the drilling implement 6 are spiral vanes 79 which provide a spiral conveyor for moving the cuttings rearwardly from the drill bit through the tube 72. Thus the cuttings created by the drill bit during the drilling operation are moved rearwardly through the tube and are discharged at the rear end of the spiral conveyor into a chamber 80 in the front plate extension 75. The chamber 80 has a bottom discharge opening 81 through which the cuttings are discharged by gravity from the chamber. The coupling member 37 has a radial flange 82 running at its periphery close to the walls of the chamber 80 to keep the cuttings from packing inwardly toward the front bearing 33.

Now referring to the improved cooling means 11, it will be noted that the motor 5 is of the air-cooled type, and has a cooling fan 84 fixed to its power shaft and contained in a cross chamber 85 at the forward end of the motor. Extending longitudinally along opposite sides of the casing body are parallel flow passages 86, 86 which communicate at their front ends with the front chamber 85 and at their rear ends with side pockets 87 connected by a cross chamber 88 at the rear end of the motor. Arranged in one pocket 87 is a motor switch 89, while in the other pocket is a fuse device 90. Formed on the exterior of the outer walls of the passages 86 are lateral cooling fins 91 for dissipating heat. Thus, when the motor 5 is running, cooling fluid such as cooling air is circulated in a closed circuit or path axially through the motor casing, then laterally through the front chamber 85, longitudinally rearwardly through the passages 86, and thence through the pockets 87 and the rear chamber 88 of the motor, to reduce the operating temperature of the latter.

In order conveniently to operate the switch 89, one of the grips 29 of the handles 4, 4 is rotatably mounted and has a lateral arm 96 pivotally connected by a link 97 to one end of a lever 98 pivoted at 99 on a bracket 100 integral with the casing body. The lever 98 at its other end is pivotally connected at 101 to a splined rod 102 suitably guided in the casing and operatively connected to the switch actuator. This operating rod is urged outwardly toward open-switch position by a spring 103. By such arrangement, the switch may be readily controlled by the operator without release of his grip on the supporting handles 4, 4.

The modified embodiment relates to the invention from its percussive aspect, and, as shown in Figs. 14 to 19 inclusive, comprises a percussive tool preferably for drilling shallow holes in concrete or similar materials, and, in this construction, the rotating mechanism for the drilling implement of the preferred illustrative embodiment is omitted. In this instance, there is a casing 105 having secured thereto at 106 at its rearward end a handle 107 for supporting and positioning the tool. Attached as by screws to one side of the casing is a flanged member 108 formed with a sleevelike, split clamp portion 109 for receiving and supporting a cylindrical portion 110 of a motor 111, herein an electric motor. Fixed to the motor shaft 112 is a curved arm or crank 113 which is engageable with an elongated crank pin 114 secured to a crank arm or disk 115. This crank disk has a shaft portion 116 in axial alignment with the motor shaft and suitably journaled in bearings supported within a tubular bearing support 117 integral with the casing. Pivotally connected to the crank pin is a connecting rod or link 118, in turn pivotally connected through a pin 119 and a slot 120 to a guide element 121. This guide element is reciprocably guided in a bore 122 in a tubular portion 123 of the casing and has threadedly attached thereto, at 124, a forwardly extending rod 125 which is threadedly connected at 126 at its forward end to an impact element 127 (see Fig. 16). The impact element 127 is reciprocably guided in a bore 128 of a tubular casing portion 129 which is arranged in axial alignment with the casing portion 123, and is coupled thereto as by a coupling sleeve 130. Loosely positioned within this coupling sleeve 130 between the adjacent ends of the casing portions 123 and 129 is a guide member 131 for guiding the rearward portion of the reciprocable rod 125. A coil spring 132 is arranged between the front end of the guide member 131 and the rear end of the impact element 127 for urging the latter forwardly. Threaded at 133 to the front end of the casing portion 129 is a front cap 134 having a hexagonal bore or socket 135 for receiving the hexagonal shank 136 of a drilling implement 137. A tappet or striking block 138 is also guided in the casing bore 128 and has a socket 138' for receiving the rearward portion of the shank of the drilling implement. A suitable securing device, such as a set screw 139, serves to secure the tappet rigidly to the shank. Arranged between the front cap 134 and the tappet 138 and surrounding the shank 136 is a coil cushion spring 140 for urging the tappet rearwardly. A collar 141, fixed to the shank 136, limits movement of the shank in a rearward direction within the cap-bore 135. The drilling implement has an integral drill bit 142 at its forward end, as shown.

During operation of the tool of the modified illustrative embodiment above described, the operator grasps the handle 107 and the forward body portion 129 of the tool casing, and when the tool is properly positioned with respect to the work, the motor 111 may be suitably started, causing the curved arm or crank 113 to turn about the motor axis. When this arm engages the pin 114 (see Fig. 17), the crank pin is turned rearwardly as shown in Fig. 19. When, or just before, the arm assumes the position shown in Fig. 18, the crank pin 114 leaves the arm, and the spring 132 moves the impact element 127 rapidly forwardly to cause the latter to strike a powerful blow on the tappet 138 which transmits the blow to the shank of the working implement. During drilling, the operator may bodily rotate the tool about its longitudinal axis, thereby to oscillate the drill bit 142 about its axis to change the position of the cutting edges of the bit as the latter is percussively actuated.

In both embodiments of the invention above described, the pin and slot connection between the connecting rod and the impact element permits the latter to strike its blow without transmission of undue shocks to the connecting rod and the crank pin. Also, this pin and slot connection permits the impact element to move on rebound after it strikes its blow freely rearwardly relative to the connecting rod without shock to the latter. The preferred embodiment of the percussive mechanism illustrated in Figs. 1 to 13 inclusive may be employed without automatic rotation mechanism, and in the modified embodiment, rotation mechanism for the drilling implement may be provided if desired.

As a result of this invention, an improved drilling apparatus is provided having improved impact mechanism whereby the drilling implement is percussively actuated in a novel manner. It will further be evident that by associating the impact mechanism with the rotating mechanism for the drilling implement, the drilling implement is percussively actuated as it is rapidly rotated so that a percussive drilling action supplements the rotary boring action to increase the drilling speed. It will further be evident that by the provision of the motor driven crank which engages the crank pin or crank arm for compressing the spring, the latter is suddenly released at its point of maximum compression so that the impact element is driven rapidly forwardly to impart a powerful blow to the drilling implement. The drilling apparatus is rugged in construction and simple in design. Other advantages of the invention will be clearly apparent to those skilled in the art.

While there are in this application specifically described two forms which the invention, in at least one of its aspects, may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. In a drilling apparatus, the combination comprising a reciprocable impact element, resilient means for urging said impact element in one direction, and motor driven mechanism for moving said impact element in the opposite direction against the action of said resilient means including relatively movable crank arms turnable about axes in the same straight line, a motor for turning one crank arm, means for operatively connecting said other crank arm to said impact element, said one arm upon turning thereof engaging said other arm to turn the latter at the same angular rate therewith thereby to move said impact element in a direction to effect compression of said resilient means, and said other arm when said resilient means attains a predetermined maximum compression being released to turn freely away relative to said one arm to effect release of said resilient means to permit the latter to drive said impact element rapidly in the opposite direction to deliver a blow.

2. In a drilling apparatus, the combination comprising an impact element adapted to deliver a rapid series of blows to a drilling implement, compressible resilient means which when released drives said impact element forwardly to effect delivery of a blow to said drilling implement, and motor driven mechanism for actuating said impact element to effect compression of said resilient means including coaxial relatively rotatable shafts, a motor for driving one of said shafts, operative connections between said other shaft and said impact element, and means on said one shaft for rotating said other shaft at the same angular rate therewith and from which automatic release is effected at a predetermined position thereof to permit free rotation of said other shaft relative to said motor driven shaft to permit said resilient means to drive said impact element forwardly to strike its blow.

3. In a drilling apparatus, the combination comprising an impact element adapted to deliver a rapid series of blows to a drilling implement, compressible resilient means which when released drives said impact element forwardly to effect delivery of a blow to said drilling implement, and motor driven mechanism for actuating said impact element to effect compression of said resilient means including coaxial relatively rotatable shafts, a motor for driving one of said shafts, operative connections between said other shaft and said impact element including a crank arm, and means including a crank pin on said one shaft for rotating said other shaft at the same angular rate therewith and from which automatic release is effected at a predetermined position thereof to permit free rotation of said other shaft relative to said motor driven shaft to permit said resilient means to drive said impact element forwardly to strike its blow.

4. In a drilling apparatus, the combination comprising a reciprocable impact element adapted percussively to actuate a drilling implement, a spring for urging said impact element in a forward direction, and motor driven mechanism for moving said impact element rearwardly against the action of said spring and embodying means for automatically releasing said impact element when said spring attains a predetermined compression including a crank arm, a relatively movable crank arm disposed in the path of movement of said first crank arm and carrying a crank pin, a connecting rod connecting said crank pin to said impact element, said first crank arm upon turning thereof engaging the rear surface of said second crank arm to turn the latter at the same angular rate therewith and said second crank arm when said arms attain a predetermined relation turning freely away from said first crank arm to permit said spring to drive said impact element forwardly to strike its blow.

5. In a drilling apparatus, the combination comprising a reciprocable impact element, a motor having a rotating power shaft, and mechanism for effecting reciprocation of said impact element including compressible resilient means for urging said impact element in one direction, a crank arm driven by said motor and having a crank pin, a second crank arm coaxial with said first crank arm and rotatable relative thereto, and operative connections between said second crank arm and said impact element, said first crank arm upon turning thereof having its crank pin engage said second crank arm for turning the latter at the same angular rate therewith to effect compression of said resilient means, and said second crank arm when said arms attain a predetermined relative position turning freely relative to said first crank arm to permit said resilient means to effect rapid movement of said impact element to cause the latter to deliver its blow.

6. In a drilling apparatus, the combination comprising a reciprocable impact element, a motor having a rotating power shaft, and mechanism for effecting reciprocation of said impact element including compressible resilient means which when released drives said impact element forwardly to effect delivery of a blow, a crank arm driven by said motor and having a crank pin, a second crank arm coaxial with said first crank arm and rotatable relative thereto and operative connections between said second crank arm and said impact element including a connecting link having a longitudinal slot and a pin passing through said slot and secured to said impact element, said first crank arm upon turning thereof having its crank pin engaging said second crank arm for turning the latter at the same angular rate therewith to effect compression of said resilient means, and said second crank arm when said arms attain a predetermined relative position turning freely relative to said first crank arm to permit said resilient means to effect rapid movement of said impact element to cause the latter to deliver its blow, said pin and slot connection when said impact element strikes its blow reducing the transmission of shock to said reciprocating mechanism.

7. In a drilling apparatus, the combination comprising a reciprocable impact element, a motor having a rotating power shaft, and mechanism for effecting reciprocation of said impact element including compressible resilient means which when released drives said impact element forwardly to effect delivery of a blow, a curved crank arm driven by said motor power shaft, a coaxial crank arm having an elongated crank pin and operative connections between said crank pin and said impact element, said first crank arm upon turning thereof engaging said crank pin for turning said second crank arm at the same angular rate therewith to effect compression of said resilient means, and said second crank arm when said arms attain a predetermined relation turning freely relative to said first crank arm to permit said resilient means to effect movement of said impact element in a direction to cause the latter to deliver its blow.

8. In a drilling apparatus, the combination comprising an impact element adapted to deliver a rapid series of blows to a drilling implement, compressible resilient means which when released drives said impact element forwardly to effect delivery of a blow to said drilling implement, and motor driven mechanism for actuating said impact element to effect compression of said resilient means to a predetermined degree including coaxial relatively rotatable shafts, the outer one of said shafts having an axial bore into which said other shaft extends and in which said latter shaft is journaled, a motor for driving one of said shafts, operative connections between said other shaft and said impact element, and means on said one shaft for rotating said other shaft therewith and from which automatic release is effected at a predetermined position thereof to permit free rotation of said other shaft relative to said motor driven shaft to permit said resilient means to drive said impact element forwardly to strike its blow.

9. In a drilling apparatus, the combination comprising an impact element adapted to deliver a rapid series of blows to a drilling implement, compressible resilient means which when released drives said impact element forwardly to effect delivery of a blow to said drilling implement, and motor driven mechanism for actuating said impact element to effect compression of said resilient means to a predetermined degree including coaxial relatively rotatable shafts, said shafts projecting in opposite directions, a motor for driving one of said shafts, operative connections between said other shaft and said impact element, and means on the inner end of said one shaft for engaging the adjacent end of said other shaft for rotating said other shaft therewith and from which automatic release is effected at a predetermined position thereof to permit free rotation of said other shaft relative to said motor driven shaft to permit said resilient means to drive said impact element forwardly to strike its blow.

10. In a drilling apparatus, the combination comprising a reciprocable impact element, resilient means for urging said impact element in one direction, and motor driven mechanism for moving said impact element in the opposite direction against the action of said resilient means including relatively movable drive members having bearing portions arranged in axial alignment, one member disposed in the path of movement of the other, a motor for driving said other drive member, means for operatively connecting said one drive member to said impact element, said other drive member upon driving thereof by said motor abutting said one drive member to move the latter in unison therewith, thereby to move said impact element in a direction to effect compression of said resilient means, and said one drive member when said resilent means attains a predetermined maximum compression moving freely away from said other drive member to effect release of said resilient means to permit the latter to drive said impact element rapidly in the direction to deliver a blow.

JOSEPH F. JOY.

References Cited in the file of this patent

UNITED STATES PATENTS

| Number | Name | Date |
| --- | --- | --- |
| 290,309 | Armstrong | Dec. 18, 1883 |
| 458,184 | Morgan | Aug. 25, 1891 |
| 870,653 | Warsop | Nov. 12, 1907 |
| 913,932 | Adams | Mar. 2, 1909 |
| 1,162,636 | Miller | Nov. 30, 1915 |
| 1,217,815 | Payne | Feb. 27, 1917 |
| 1,566,733 | Carter | Dec. 22, 1925 |
| 1,720,364 | Holmes | July 9, 1929 |
| 2,353,321 | Snodgrass | July 11, 1944 |
| 2,457,565 | Kott | Dec. 28, 1948 |